US012070758B2

(12) United States Patent
Ligertwood et al.

(10) Patent No.: US 12,070,758 B2
(45) Date of Patent: Aug. 27, 2024

(54) CENTRIFUGE SYSTEM WITH A MEASUREMENT REGION OF A DIVERTER FLUID CIRCUIT

(71) Applicants: M-I L.L.C., Houston, TX (US); Mantovani & Vicentini S.R.L., Berra Ferrara (IT)

(72) Inventors: Brian Ligertwood, Houston, TX (US); Daniele Marozzi, Berra Ferrara (IT); Colin Stewart, Houston, TX (US); Richard Bingham, Katy, TX (US); Bojan Mitric, Houston, TX (US); Luciano Guandalini, Occhiobello Rovigo (IT)

(73) Assignees: SCHLUMBERGER TECHNOLOGY CORPORATION, Sugar Land, TX (US); MANTOVANI & VICENTINI S.R.L., Berra Ferrara (IT)

( * ) Notice: Subject to any disclaimer, the term of this patent is extended or adjusted under 35 U.S.C. 154(b) by 965 days.

(21) Appl. No.: 15/733,615

(22) PCT Filed: Mar. 27, 2019

(86) PCT No.: PCT/US2019/024169
§ 371 (c)(1),
(2) Date: Sep. 16, 2020

(87) PCT Pub. No.: WO2019/191155
PCT Pub. Date: Oct. 3, 2019

(65) Prior Publication Data

US 2021/0008572 A1 Jan. 14, 2021

Related U.S. Application Data

(60) Provisional application No. 62/648,392, filed on Mar. 27, 2018.

(51) Int. Cl.
*B04B 11/02* (2006.01)
*B04B 13/00* (2006.01)
(Continued)

(52) U.S. Cl.
CPC .............. *B04B 11/02* (2013.01); *B04B 13/00* (2013.01); *B04B 15/06* (2013.01); *E21B 21/065* (2013.01)

(58) Field of Classification Search
CPC ......... B04B 11/02; B04B 13/00; B04B 15/06; E21B 21/065
See application file for complete search history.

(56) References Cited

U.S. PATENT DOCUMENTS

2004/0259266 A1* 12/2004 Barringer, Jr. ......... B01D 61/18 422/68.1
2016/0236208 A1* 8/2016 Vicentini .................. B04B 7/18

FOREIGN PATENT DOCUMENTS

RU 2636571 C2 11/2017
SU 1335672 A1 * 9/1987
(Continued)

OTHER PUBLICATIONS

International Search Report and Written Opinion issued in International Patent application PCT/US2019/024169 on Jun. 27, 2019, 8 pages.
(Continued)

*Primary Examiner* — Walter D. Griffin
*Assistant Examiner* — Shuyi S. Liu
(74) *Attorney, Agent, or Firm* — Jeffrey D. Frantz

(57) ABSTRACT

An apparatus may include a centrifuge bowl rotatable about its longitudinal axis, a discharge unit positioned to receive discharge fluid from the centrifuge bowl, a diverter fluid circuit in communication with the discharge unit, a measurement region of the diverter fluid circuit with a narrower
(Continued)

diameter than a cross section of the discharge unit, and the diverter fluid circuit oriented to direct a portion of the discharge fluid from the discharge unit to the measurement region.

14 Claims, 12 Drawing Sheets

(51) Int. Cl.
*B04B 15/06* (2006.01)
*E21B 21/06* (2006.01)

(56) References Cited

FOREIGN PATENT DOCUMENTS

| | | | | |
|---|---|---|---|---|
| SU | 1335672 | A1 | 9/1987 | |
| WO | 9823380 | A1 | 6/1998 | |
| WO | WO-9823380 | A1 * | 6/1998 | ............. B04B 13/00 |
| WO | 2016084022 | A1 | 6/2016 | |

OTHER PUBLICATIONS

International Preliminary Report on Patentability issued in International Patent application PCT/US2019/014169, mailed Oct. 8, 2020, 7 pages.

* cited by examiner

CENTRIFUGE SYSTEM WITH A MEASUREMENT REGION OF A DIVERTER FLUID CIRCUIT

This application is a national stage entry under 35 U.S.C. 371 of International Application No. PCT/US2019/024169, filed Mar. 27, 2019, which claims priority from U.S. Provisional Application No. 62/648,392, filed Mar. 27, 2018, herein incorporated by reference in its entirety.

BACKGROUND

A centrifuge is a device that separates solid material from liquids. The centrifuge may include a bowl that rotates about a horizontal axis. A slurry may be supplied into the bowl through an inlet of the bowl. As the bowl is rotated, different types of materials in the slurry separate by their different densities.

Drill rigs may use centrifuges to reuse drilling fluid. The drill rig may circulate drilling mud through the center of a drill string, out the nozzles in the drill bit, and up the annulus of the wellbore. The drilling fluid can be used to remove cuttings from the bottom of the wellbore. The drilling mud can be directed to a centrifuge located on the drill rig to remove the cuttings from the drilling mud. The centrifuged drilling mud can be recirculated into the well bore through the center of the drill string. The centrifuges allow for the drilling mud to maintain its properties during each cycle through the drill string.

Centrifuges are used in metal cooling applications to separate solids and tramp oil from metal working coolants. The centrifuge intakes used coolant that was previously applied to hot metal surfaces. The centrifuge coolant is redirected to a storage tank for later reuse as a coolant.

Centrifuges can also be used to clean city water or wash water to separate water from sludge. Centrifuges are also used in the food and pharmaceutical industries. Fats can be separated from milk using a centrifuge.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
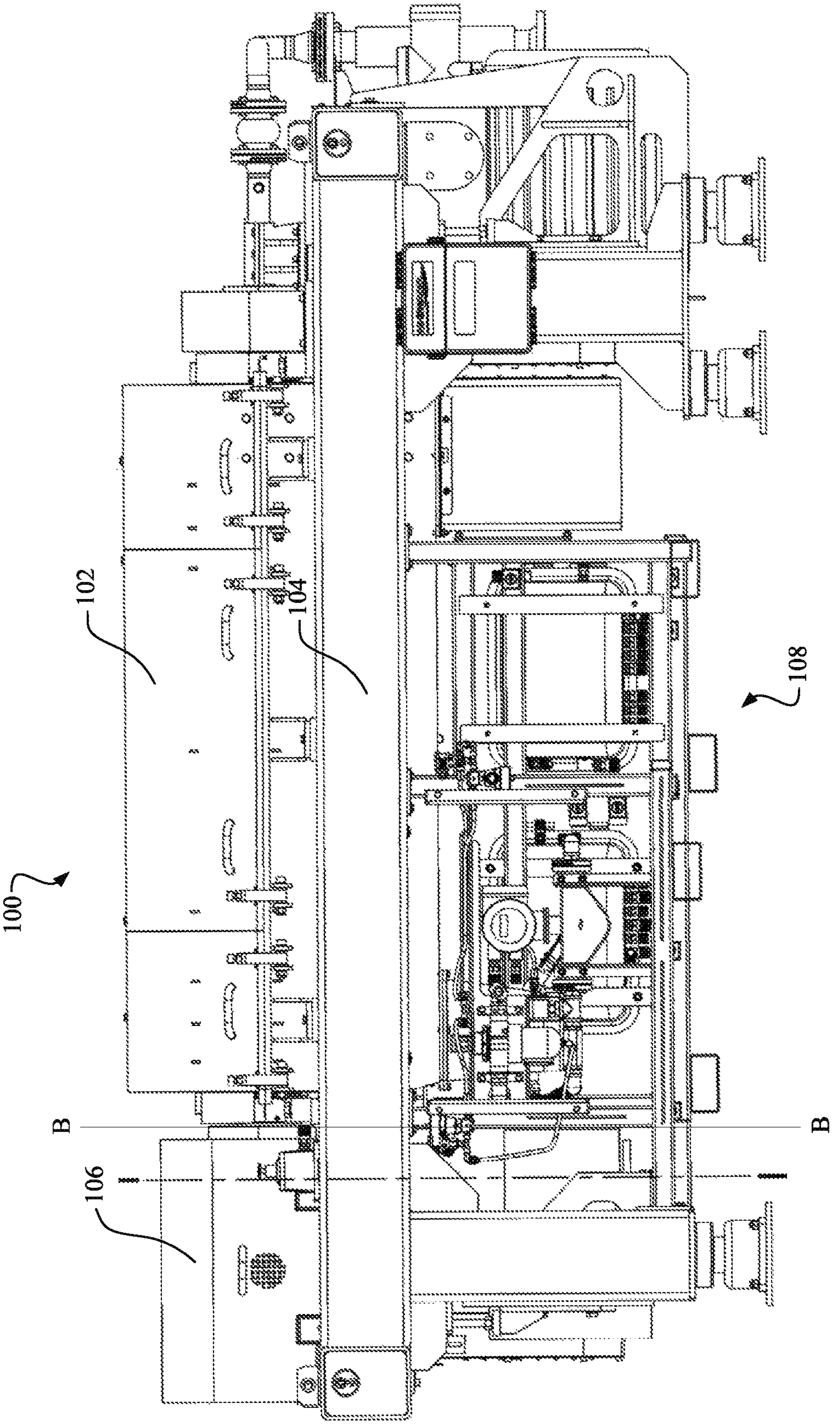
FIG. 1 depicts an example of a centrifuge in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Drilling fluid is circulated down the drill string, out the nozzles in the drill bit, and up the annulus of the wellbore. The drilling fluid can be used to remove cuttings from the bottom of the wellbore. Often, the drilling fluid is cleaned at the drill rig site to remove cuttings and other debris. During the cleaning process, the drilling fluid may be directed through a centrifuge where the cuttings and other types of debris are separated from the drilling fluid. The drilling fluid discharged from the centrifuge may undergo further processing, be directed back down the borehole, or combinations thereof. In some cases, drilling fluid is run through several purification stages, and removing solids in the drilling fluid with a centrifuge can be one of those purification stages.

FIG. 1 depicts an example of a centrifuge 100. A bowl 102 is rotatably connected to a frame 104, and a motor 106 drives the rotation of the bowl 102 of the centrifuge 100. A diverter fluid circuit 108 connected to the frame 104 that removes at least some of the fluid discharged from the bowl 102.

Figure 2:
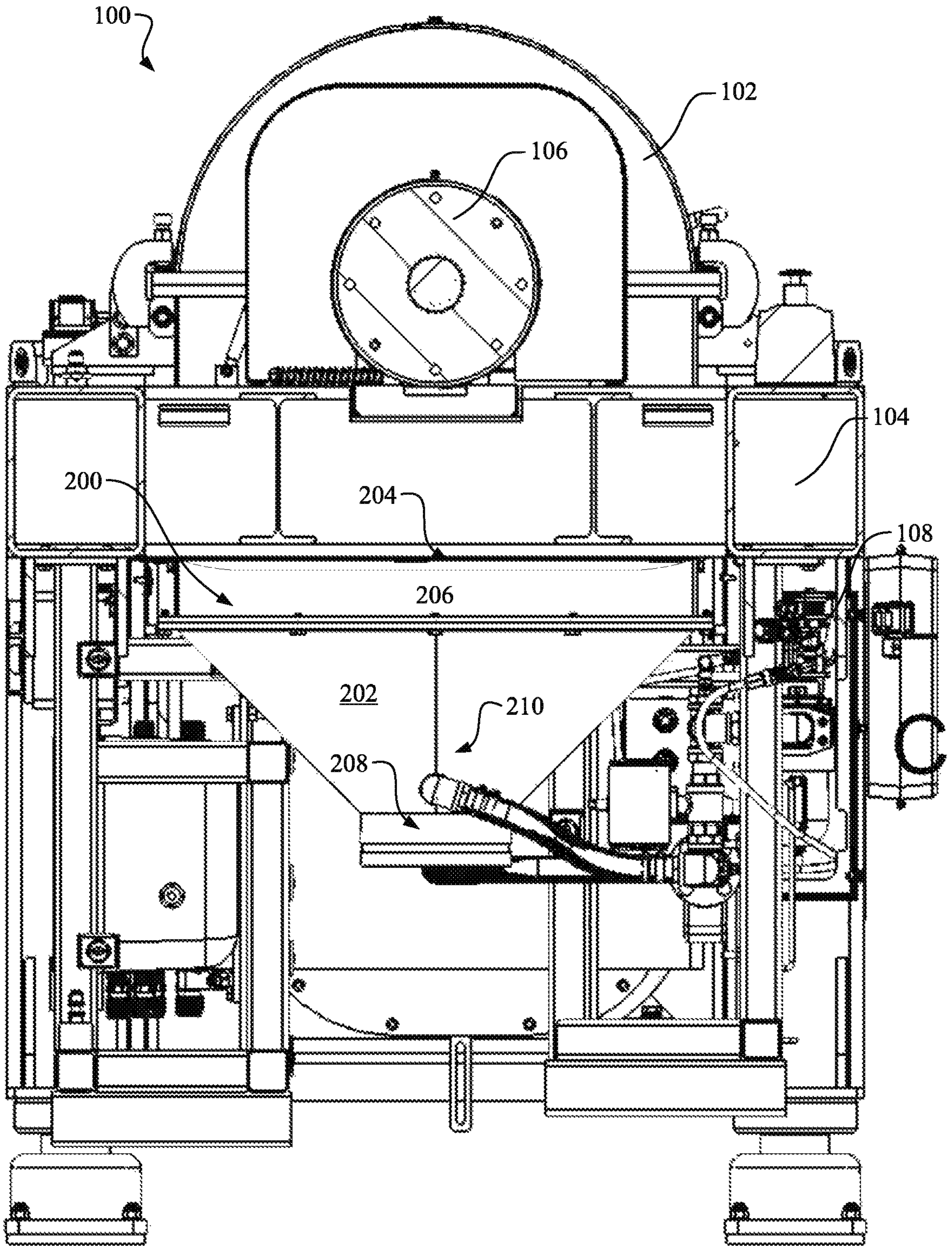
FIG. 2 depicts an example of a cross section of the centrifuge of FIG. 1 taken along the lines B-B.

FIG. 2 depicts an example of the centrifuge 100 taken along the lines of B-B of FIG. 1. In this example, the discharge unit 200 includes a discharge funnel 202 that is located underneath the motor 106. The discharge funnel 202 is positioned to receive discharge fluid from an outlet of the bowl 102.

A receiving end 204 of the discharge funnel 202 includes a width 206 that is sufficiently large to collect the discharge fluid as the discharge fluid exits the bowl 102. The width 206 of the discharge funnel 202 narrows towards an exit end 208 of the discharge funnel 202 forcing the received discharge fluid into a smaller diameter. An opening is defined in the exit end 208 that directs the discharge fluid towards a tank where the discharge fluid can accumulate and be stored for a time.

The discharge fluid generally may exit the bowl 102 in a discontinuous manner. For example, the discharge fluid may exit the bowl 102 in a rain fashion that includes drops or clumps of the discharge fluid exiting the bowl 102. Due to the volume in the discharge funnel 202, the discharged fluid may not generally fill the cross section of the discharge funnel 202. Without the discharge fluid filling the cross section of the discharge funnel 202, the discharge funnel 202 may not provide an adequate location to perform certain testing on the discharge fluid, such as density measurements. The density of the drilling mud can be measured prior to entering the centrifuge 100, such as prior to entering the bowl 102, and the density of the drilling mud can be measure at an exit of the centrifuge 102, such as an exit of the bowl 102. By measuring the density of the drilling mud entering the centrifuge 100 and the discharge fluid exiting the centrifuge 100, the changes of the fluid may be determined. For example, the change of the weight of the drilling mud and the concentration of solids removed by the centrifuge 100 may be determined by the difference in these densities. In some situations, changes to the operating parameters of the centrifuge 100 may be changed based on the an amount of solid materials removed from the drilling mud. In some cases, the change in densities may be communicated to an operator to make changes to the operation parameters of the centrifuge 100. In other examples, the centrifuge 100 may be self-regulated. An example of the operating parameters that may be changed based on the difference of the densities may include modifying the rotary speed of the bowl 102, changing the volume of the drilling mud entering the centrifuge 100, changing another parameter, or combinations thereof.

In the example depicted in FIGS. 1 and 2, a diverter fluid circuit 108 is connected to the discharge funnel 202 to remove at least a portion of the discharge fluid from the discharge funnel 202. The diverter fluid circuit 108 may have a predetermined diameter size based on the flow rates provided to the centrifuge 100. For example, the diameter may be a size such that the removed discharge fluid can fill the cross section of the diverter fluid circuit 108. Filling the cross-section of the diverter fluid circuit 108 can allow the diverter fluid circuit 108 to perform certain tests that may not be capable of being performed in the discharge funnel 202. For example, a density measurement test may be performed in the diverter fluid circuit 108 where the discharge funnel 202 may not have provided a suitable location for performing a density measurement test since the discharge fluid does not fill the cross section of the discharge funnel 202.

An inlet 210 of the diverter fluid circuit 108 is depicted in FIG. 2. The diverter fluid circuit 108 can include a mass flow meter that determines density for a portion of the discharge fluid. An outlet (356, FIG. 3B) can be configured to return the portion of the discharge fluid to the discharge funnel 202. The portion of the discharge fluid that was measured or otherwise tested may be directed with the remaining portion of the discharge fluid to the tank or other location. An advantage of the diverter fluid circuit 108 can include real-time measurements of the discharge fluid that represent the actual fluid properties of the discharge fluid at or near the outlet 356 of the centrifuge 100. Real-time measurements of the discharge fluid can be used by an operator or an analyst to determine the properties of the discharge fluid, compare the properties to preferred predetermined or ideal properties, and monitor changes to the properties of the discharge fluid over time. Additionally, the real-time measurements can be used to change the operation of the centrifuge 100 based on the properties of the discharge fluid and/or the properties and rates of fluid being provided to the centrifuge 100.

Other measurements may be performed on the discharge fluid in the diverter fluid circuit 108 in accordance with the principles described in the present disclosure. For example, sensors included in the diverter fluid circuit 108 may include sensors that test for density, fluid flow rate, rheology, weight, other physical properties, electrical resistance, other electrical characteristics, magnetic characteristics, temperature, pH levels, chemical properties, radiation levels, other types of properties, or combinations thereof. In some examples, the diverter fluid circuit 108 includes a mass flow meter, a rheology meter, a viscometer, a rheometer, a magnetometer, an accelerometer, a thermometer, an electrode, a weight scale, a gamma detector, another type of nuclear detector, another type of sensor, or combinations thereof.

Figure 3A:
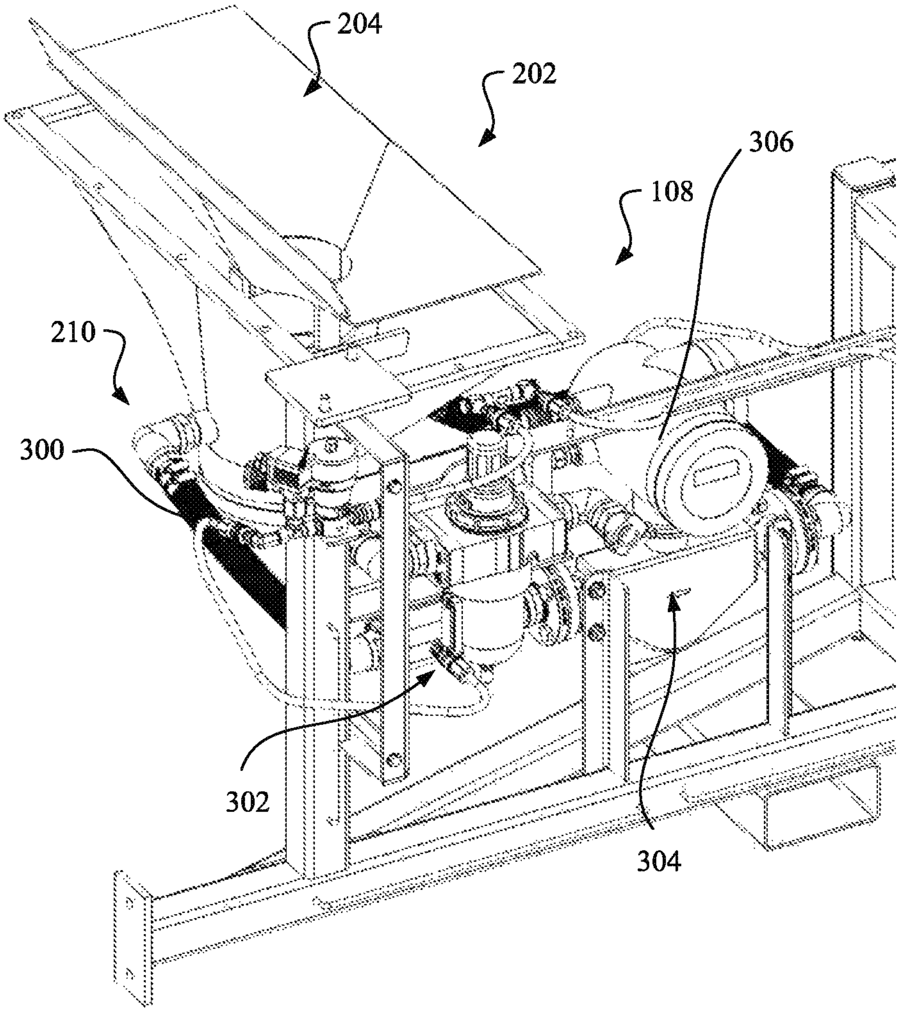
FIG. 3A depicts an example of a diverter fluid circuit connected to a discharge unit in accordance with the present disclosure.

FIG. 3A depicts an example of the diverter fluid circuit 108 connected to the discharge funnel 202. In this example, the inlet 210 of the diverter fluid circuit 108 is connected to the discharge funnel 202. An inlet tube 300 can direct the discharge fluid from the inlet 210 to a regulator 302. In some cases, the regulator 302 controls the flow of the discharge fluid through the diverter fluid circuit 108. In some cases, the regulator 302 may control the amount of discharge fluid within a testing chamber associated with at least one sensor of the diverter fluid circuit 108. In some cases, the regulator 302 may be a pinch valve, a ball valve, a butterfly valve, a pressure reducing valve, another type of valve, or combinations thereof. The regulator 302 may be remotely controlled by an operator, can be locally controlled and/or can be automated to maintain a predetermined amount of discharge fluid in the testing chamber.

In some cases, a filter may be incorporated into the inlet tube 300 that removes debris above a threshold particle size from the discharge fluid. The filter may be located within the inlet tube 300 between the inlet 210 of the diverter fluid circuit 108 and a regulator 302 located in the diverter fluid circuit 108. The filter may block large particles in the discharge fluid that may clog the diverter fluid circuit 108 or interfere with testing. The fluid may flow through the filter to remove the particles that are above a predetermined size. In some cases, the filter may be used to prevent or at least delay the accumulation of debris in the regulator or other types of valves within the diverter fluid circuit 108. The filter may be mesh screen. In other examples, the filter may be a disc filter, funnel filter, another type of filter, or combinations thereof.

In some embodiments, a mass flow meter 304 may be located between the regulator 302 and an outlet tube 306. The mass flow meter 304 may measure at least one characteristic of the discharge fluid. For example, the mass flow meter may measure a mass flow rate of the discharge fluid through the inlet tube 300. The mass flow rate may be the mass of the fluid traveling past a fixed point in the diverter fluid circuit 108 per unit of time. The mass flow meter 304 may be used to measure density.

Any appropriate type of density sensor may be used. In one example, the density sensor may be a coriolis density meter that measures a characteristic of the discharge fluid as the discharge fluid moves through the density meter. Coriolis density meters may measure the movement/vibrations of internal components of the density meter. These movements may be measured as the discharge fluid sample passes through the density sensor. This frequency correlates to the discharge fluid sample's density.

A volumetric flow rate may be related to the discharge fluid's density and may be obtained by dividing the mass flow rate by the discharge fluid's density. In some cases, the density of the discharge fluid may change with temperature, pressure, composition, or another property of the discharge fluid. Additional components may be included in the diverter fluid circuit 108 to assist with making at least some of the characteristics of the discharge fluid consistent for testing purposes. For example, a pump and/or a pressure relief may be incorporated into the diverter fluid circuit 108 to maintain a pressure of the discharge fluid as discharge fluid is measured.

In some cases, the bowl 102 of the centrifuge 100 is positioned over the discharge funnel 202 and gravity may direct at least a portion of the discharge fluid into the diverter fluid circuit 108. In some examples, a pump may be used in addition to gravity to move the discharge fluid through the diverter fluid circuit 108. In some cases, a pump can be used as the primary force to move discharge fluid through the diverter fluid circuit 108. Additionally, a cooling and/or heating component may be incorporated into the diverter fluid circuit 108 to maintain a temperature desired for testing.

An outlet tube 306 may be connected to the mass flow meter 304. The outlet tube 306 may direct the tested discharged fluid back to the discharge funnel 202.

A cleaning fluid source 308 may be in communication with the diverter fluid circuit 108. In some cases, the cleaning fluid source 308 contains air, water, drilling fluid, base oil, or other fluid. In an embodiment, the cleaning fluid source 308 may be a compressor, such as an air compressor. The compressor may be used to direct compressed gas or liquid, such as compressed air through the diverter fluid circuit 108 to remove remaining discharge fluid from clear out at least a portion of the diverter fluid circuit 108. While this example is described with an air compressor as the cleaning fluid source and compressed air as the cleaning fluid, any appropriate type of cleaning fluid source or cleaning fluid may be used in accordance with the principles described in the present disclosure.

The cleaning fluid source 308 may be activated automatically or manually by an operator. For example, the cleaning source may be automatically activated after a predetermined number of tests, when a reading above a predetermined range is obtained, after a predetermined time of operation, or in response to another type of condition. In some cases, the cleaning fluid source 308 is activated when the centrifuge 100 is started or when the centrifuge 100 is turned off. In some cases, when the centrifuge 100 has a change in operation, the cleaning fluid source 308 is activated, such as when the bowl 102 is caused to rotate at a different speed or when a change of discharge fluid volume is supplied to the bowl 102.

In other examples, a sensor may be incorporated into the diverter fluid circuit 108 or portion of the centrifuge 100 that measures vibrations that are indicative of a clogged diverter fluid circuit 108. In response to an output from this sensor, the cleaning fluid source 308 may release the cleaning fluid into at least a portion of the diverter fluid circuit 108 for cleaning. In some cases, the release of cleaning fluid from the cleaning fluid source is automatically triggered based on an operation performed by the centrifuge 100 or by a condition sensed in the centrifuge 100 or sensed in the diverter fluid circuit 108.

Figure 3B:
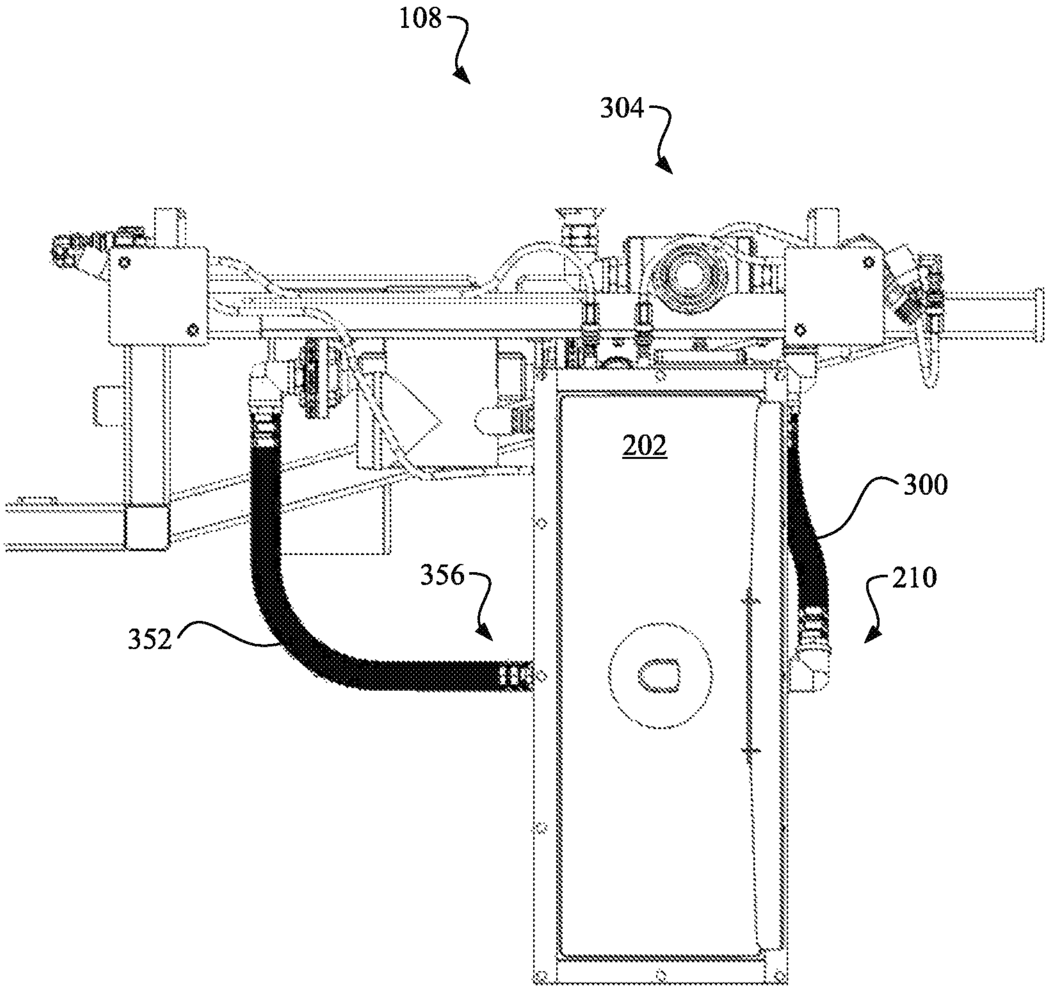
FIG. 3B depicts a top view of an example of the diverter fluid circuit connected to a discharge unit of FIG. 3A.

FIG. 3B depicts an example of the discharge funnel 202 and the diverter fluid circuit 108 connected to the discharge funnel 202. In this example, the inlet tube 300 is connected to the discharge funnel 202 on a first side 350. The inlet tube 300 directs the discharge fluid to the mass flow meter 304 where the density of the discharge fluid is measured. An outlet tube 352 connects the mass flow meter 304 to a second side 354 of the discharge funnel 202. In the example of FIG. 3B, the outlet tube 352 returns the tested discharge fluid to the second side 352, which is opposite the first side 350, where a portion of the discharge fluid is directed into the inlet 210 of the diverter fluid circuit 108. By having the tested discharge fluid returned to the discharge funnel 202 at a location away from the inlet 210, the tested discharge fluid is less likely to mix with the portion of the discharge fluid that is likely to enter the inlet 210 of the diverter fluid circuit 108. In other examples, however, the inlet 210 and the outlet 356 of the diverter fluid circuit 108 may be on the same side or area of the discharge funnel 202.

Figure 4:
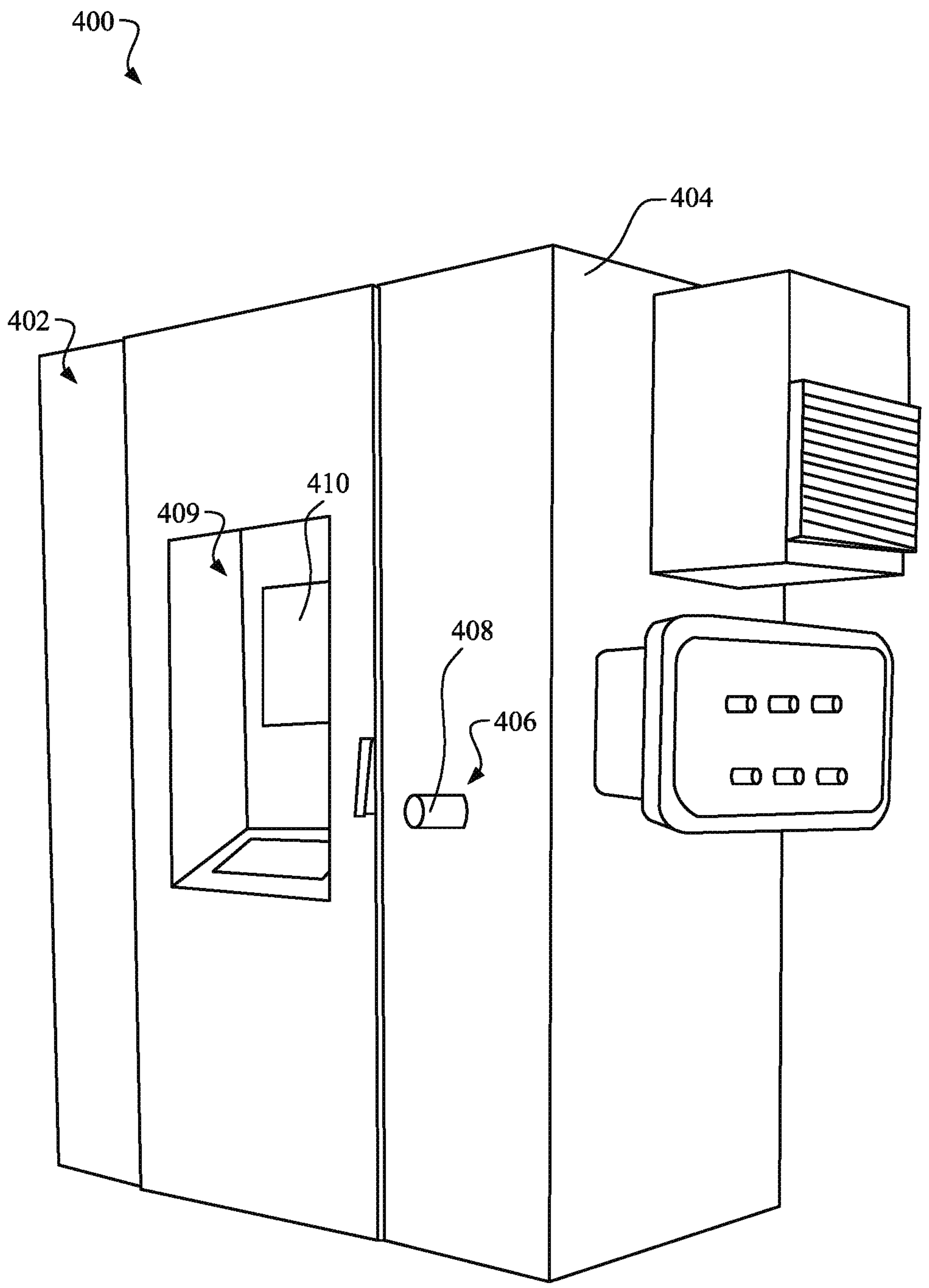
FIG. 4 depicts an example of a control panel in accordance with the present disclosure.

The centrifuge 100 may be controlled with a controller 400 that is depicted in FIG. 4. The controller 400 may be versatile to control a wide variety of machines, such as centrifuges and other types of equipment including different models of the same type of machine. In some cases, the controller 400 can control multiple different types of centrifuges that are of different types, models, and other variations. The controller 400 may be fitted with a pre-programmed radio frequency identification (RFID) tag containing information such as asset serial number, model, type, which type of hazardous area the machine is built for as well as level of automation and smartness the system is fitted with. In some situations, the information may also include the location where the centrifuge 100 is to be operated. Different laws, regulations, and certifications may be required in different locations, and by identifying the location of the centrifuge 100, the controller may determine which parameters that the centrifuge 100 is to be operated at. Additionally, different centrifuges may be operated with different options, and the RFID tag may include the options at which the centrifuge is to be operated. The RFID tag may identify the centrifuge 100 to assign the appropriate parameters for operating the centrifuge based on the features, options, and other parameters that are available to that particular centrifuge.

In some cases, the RFID tag may also record the operating history of the centrifuge 100, including but not limited to time in operation, location history, measurement information related to the centrifuge 100, measurement information related to the discharge fluid and other information. The RFID tag may store information as to the manufacturer of various components of the centrifuge 100, assembler, time of manufacture and assembly of the components of the centrifuge 100 and other information that will be appreciated by those having ordinary skill in the art. The maintenance history, such as but not limited to time and locations of previous maintenance, individual and/or company involved in the maintenance, notes related to previous maintenance, or the like. The RFID may contain information related to the time in which maintenance should occur based on the operating conditions of the centrifuge 100. An error log, run times, and other types of information may be recorded to the RFID tag and be available to controller while the centrifuge 100 is being operated by the controller.

The RFID tag may include information written in characters where each character is associated with a particular parameter. In some cases, the RFID includes between 20 and 50 characters representing information. However, any appropriate amount of information may be written to the RFID tag.

RFID technology may enable the controller 400 to recognize specifics of the centrifuge 100 that the controller is paired with. This may enable the controller 400 and choose the applicable control program and associated performance operating parameters and populate the control system accordingly. By having this information stored in the RFID tag, human error may be reduced and/or eliminated and may also increase performance when the centrifuge 100 is run by novice operators.

The RFID tag may be communication with the controller 400 to transfer information about the centrifuge 100. In some cases, the centrifuge 100 may be operated in a hazardous environment, such as on a drill rig where a potential risk of flammable gases or other types of hazardous gases exists. To ensure safety when operating electrical equipment on the drill rig, the controller 400 may include an enclosure 402 that is made of a hazardous environment barrier 404. The hazardous environment barrier 404 may separate the components within the enclosure 402 from the hazardous environment outside of the enclosure 402. In some cases, the inside of the enclosure 402 is purged with a pressurized gas to push out potentially hazardous gases from within the enclosure 402. With the hazardous gases purged out of the enclosure, the environment within the enclosure 402 may be safe to operate certain devices that run on electrical power, such as the controller 400, the monitor, servers, RFID readers, other types of equipment, or combinations thereof.

In some cases, the hazardous environment barrier 404 may be made, in part, of a stainless steel or another type of material that generally interferes with the passage of wireless signals. To overcome the wireless communication interference imposed by the hazardous environment barrier 404, a first opening 406 may be cut out of the hazardous environment barrier 404 to allow a wireless signal to pass. The first opening 406 may be plugged with a housing 408 that is insertable into the first opening 406. The housing 408 may be made of a material that permits the passages of wireless signals. In some cases, a hardened plastic, such as polyurethane, polypropylene, another type of polymer, or another type of plastic may be employed to form at least a portion of the housing 408.

In some cases, the information written to the RFID tag has unique scheme that can read by the RFID reader and processed by the controller within the enclosure. In some examples, without the proper RFID tag in communication with the RFID reader, the centrifuge may be inoperable. The code used for controlling and operating the centrifuges may be stored on the RFID tag.

A second opening 409 may be defined in the enclosure 402. The second opening 409 may be fitted with a transparent window 410. The material of the transparent window 410 may be robust enough to separate the hazardous environment outside of the enclosure 402 from the purged environment inside the enclosure 402. In some cases, the transparent window 410 is made of a tempered glass. A capacitive touchscreen film may be deposited on the back side of the transparent window 410. The capacitive touchscreen film and the transparent window 410 may collectively form a touchscreen that is operable by the touch of an operator's fingers.

The transparent window 410 may be secured to a bezel (502, FIG. 5) is that sealed into the second opening 409 with a gasket. The transparent window 410 may form, in part, an air-tight barrier in the enclosure 402, and the capacitive touchscreen film may be on the inside of the enclosure within the purged environment.

The enclosure 402 may be purged with the pressurized gas when the transparent window 410 is installed. A monitor (500, FIG. 5) may be disposed within the enclosure 402 and viewable through the transparent window 410. The operator may interact with the monitor by touching the transparent window 410 to active the capacitive touchscreen film on the transparent window's backside. The capacitive touchscreen film may be connected to a wired circuit that communicates the commands instructed by the user to the monitor. The operator may control the monitor while the operator is within the hazardous environment, but the monitor is within the purged environment of the enclosure 402.

The transparent window 410 may be any appropriate thickness. In some examples where the transparent window 410 is made of tempered glass, the thickness of the transparent window is approximately 6.0 millimeters. In other examples, the transparent window may be between 3.0 and 9.0 millimeters. In some examples, a tempered glass, transparent window with a thickness of over 7.0 millimeters is too thick to allow an operator's finger touch to activate the capacitive touchscreen film on the backside of the transparent window 410 when the user touches the opposite side of the transparent window 410. Also, in some examples, a tempered glass, transparent window with a thickness less than 5.0 millimeters is too weak to withstand a safety margins desired when moving heavy equipment on a drill rig.

Figure 5:
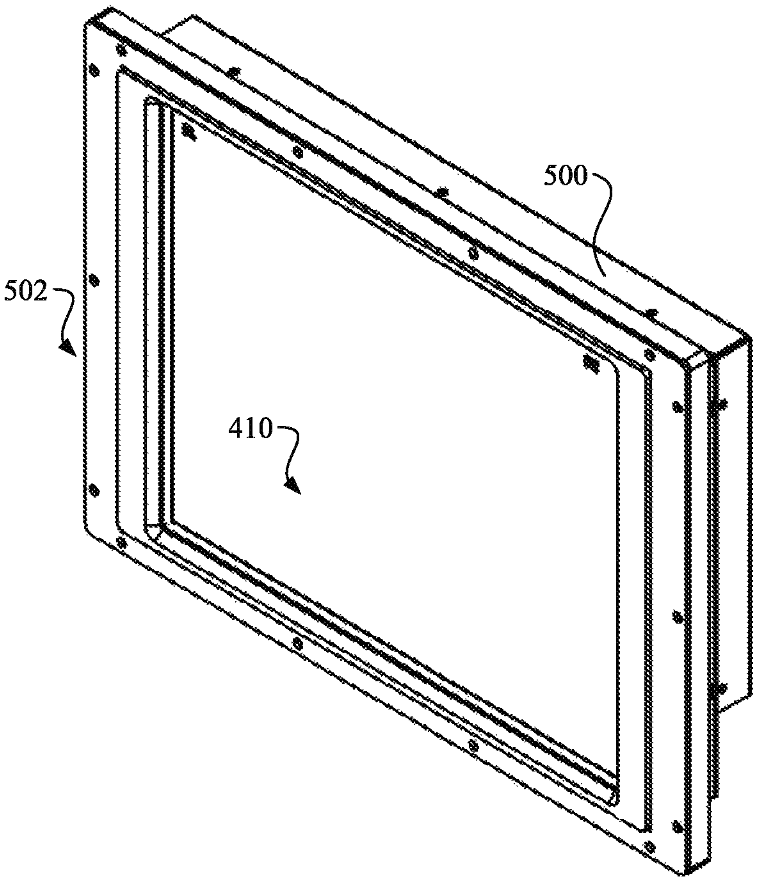
FIG. 5 depicts an example of a display of a control panel in accordance with the present disclosure.
Figure 6:
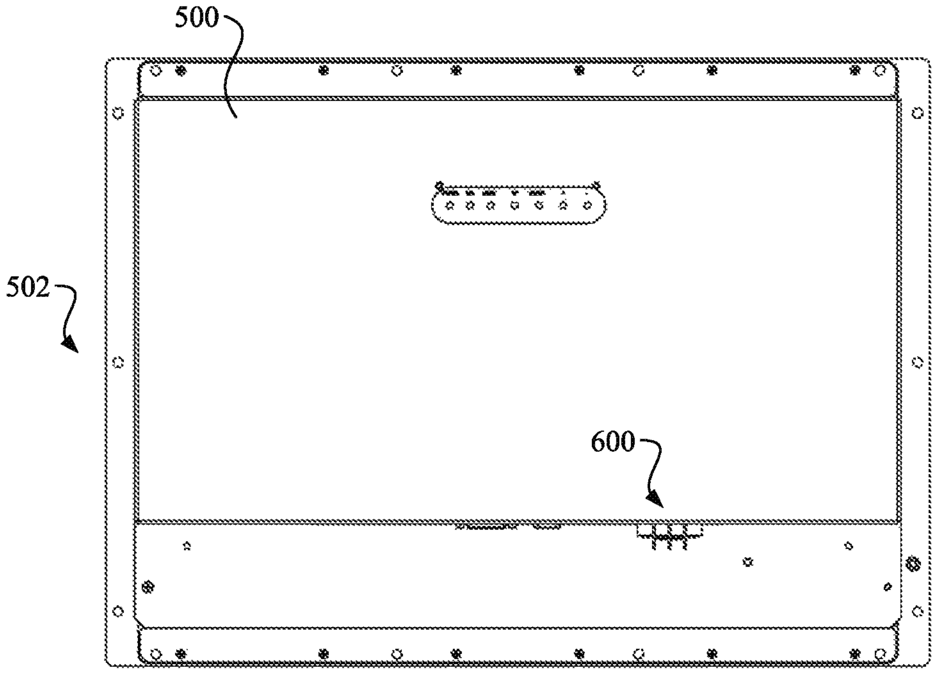
FIG. 6 depicts an example of a monitor of a control panel in accordance with the present disclosure.
Figure 7:
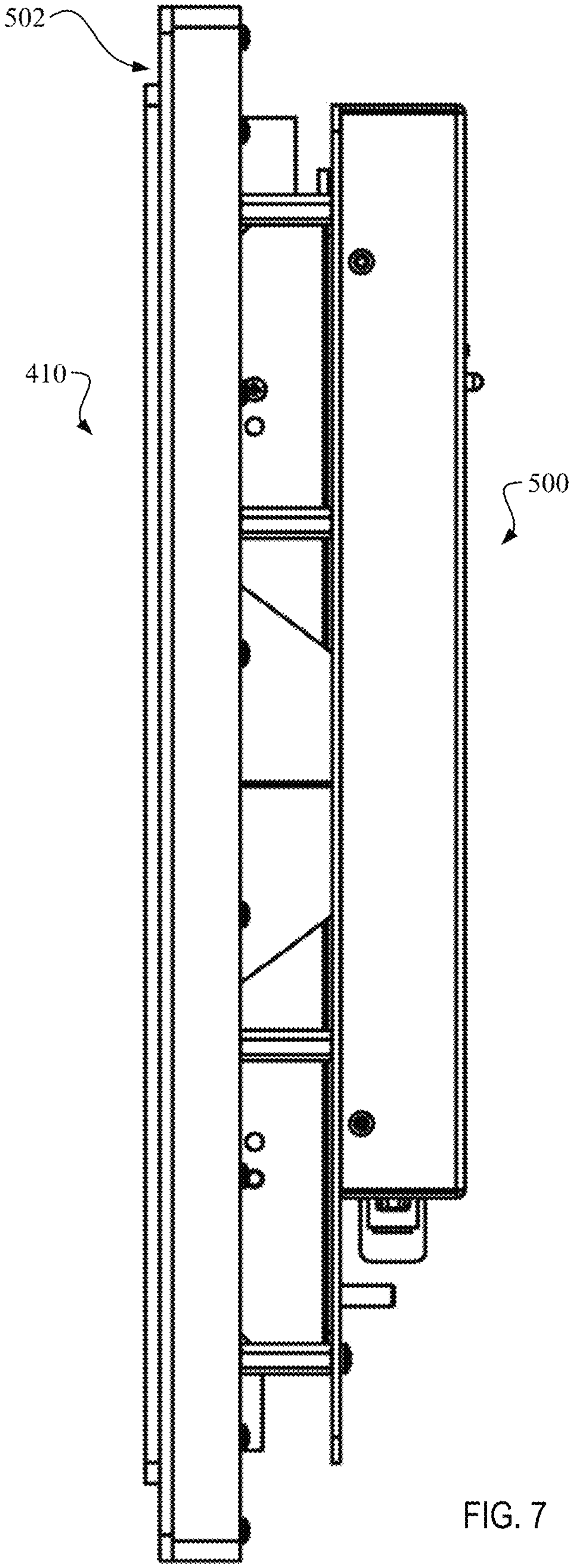
FIG. 7 depicts an example of a monitor connected to a display of a control panel in accordance with the present disclosure.
Figure 8:
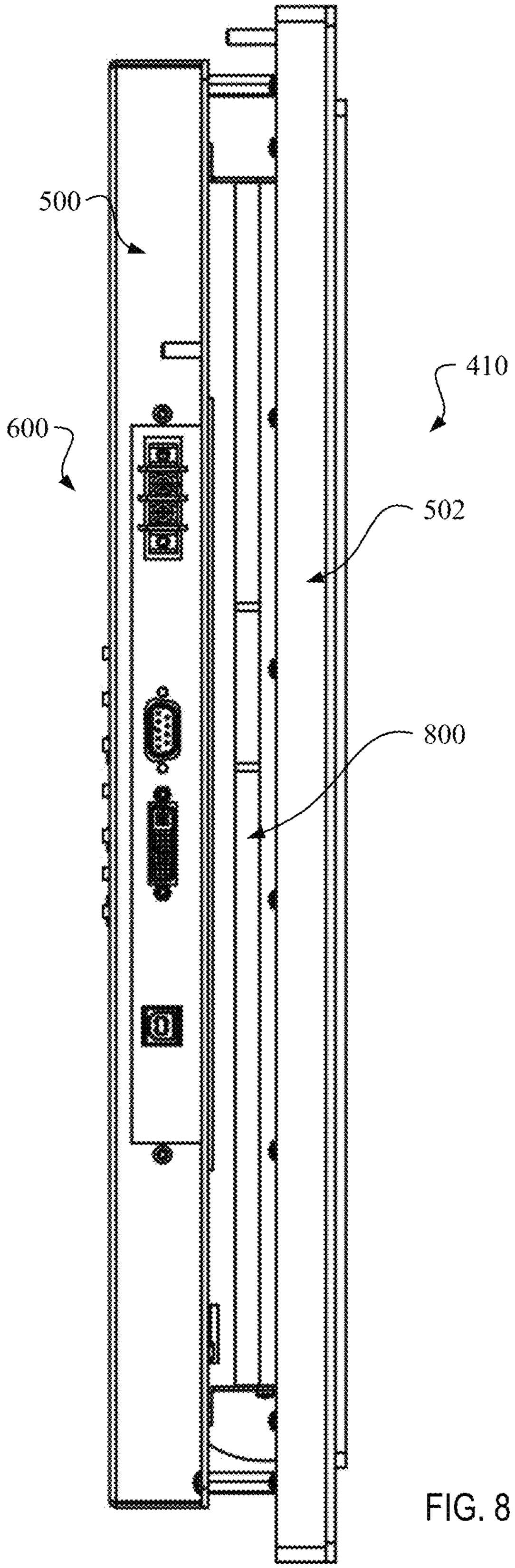
FIG. 8 depicts an example of an opposing side of the monitor depicted in FIG. 7.

FIGS. 5-8 depict an example of a monitor 500 and the transparent window 410. FIG. 5 depicts an example of the transparent window 410 secured within a bezel 502 to be fitted into the second opening 409. FIG. 6 depicts a view of an example of a monitor 500 from the purged environment side of the monitor 500. FIG. 7 depicts a top view of the monitor 500 connected to the bezel 502. FIG. 8 depicts a bottom view of the monitor 500 connected to the bezel 502.

In the example of FIG. 5, the transparent window 410 is secured within the bezel 502. A gasket placed between the transparent window 410 and the bezel 502 causes the connection between the transparent window 410 and the bezel 502 to be air-tight.

FIG. 6 depicts that the monitor 500 includes multiple electrical connectors 600 that may be connected to the capacitive touchscreen film or other components within the enclosure. FIG. 7 depicts the connection between a portion of the bezel 502 and the monitor 500.

FIG. 8 depicts that the monitor 500 is connected to the bezel 502, but separated from the backside of the transparent window 410 where the capacitive touchscreen film is deposited. A gap 800 exists between the transparent window 410 and the monitor 500. The gap 800 protects the capacitive touchscreen film from contact with the monitor 500. In some cases, the gap is between 1.0 and 10.0 millimeters wide. In some cases, the gap is between 2.0 and 7.0 millimeters. In another example, the gap is between 3.0 and 5.0 millimeters. In one example, the gap is approximately 4.0 millimeters. The gap 800 may be filled with the pressurized air within the enclosure. In some examples, the gap 800 provides a space where cool, dry air can remove condensation from the back side of the transparent window 410 and/or on the monitor 500.

The pressurized air may push out entrapped gases, such as hazardous gases out of gap 800 and/or out of the enclosure. The pressurized air may also maintain a positive pressure within the enclosure and/or within the gap 800 to prevent hazardous gas from reentering the enclosure.

Figure 9:
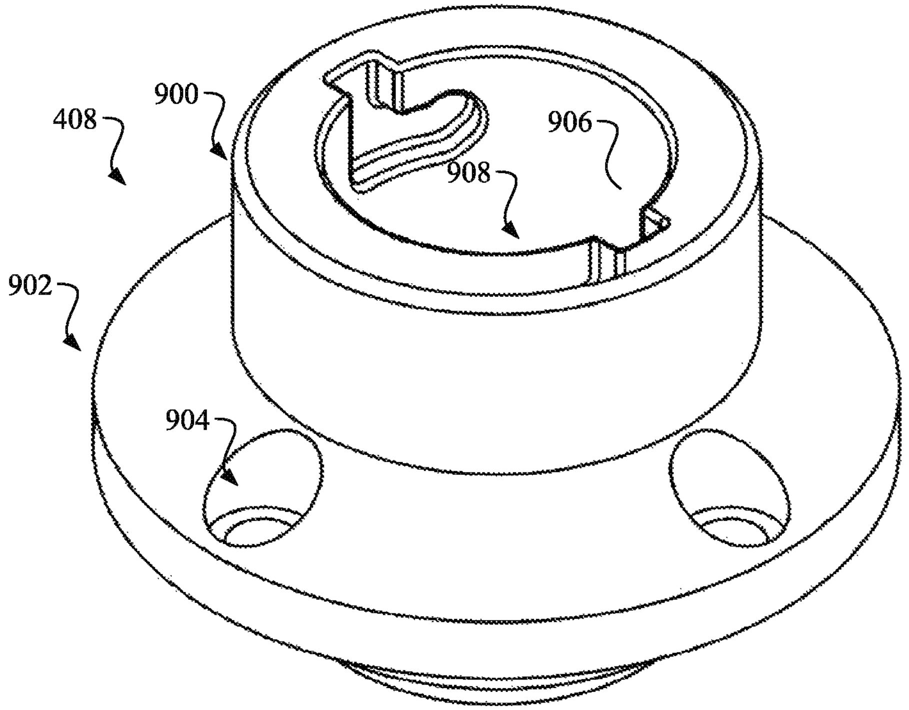
FIG. 9 depicts a perspective view of an example of an RFID housing in accordance with the present disclosure.
Figure 10:
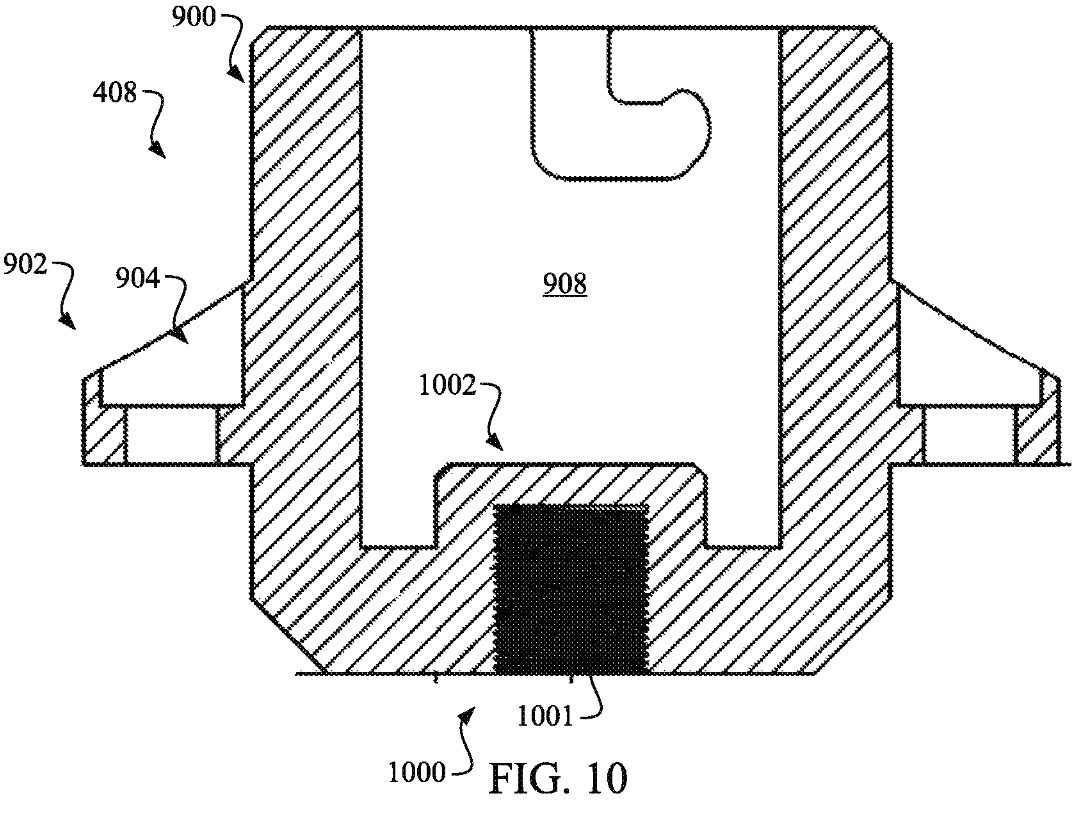
FIG. 10 depicts a cross sectional view of an example of an RFID housing in accordance with the present disclosure.

FIG. 9 depicts an example of a housing 408 securable to the first opening 406 of the enclosure. FIG. 10 depicts a cross sectional view of the housing 408 depicted in FIG. 9. In this example, the housing 408 includes an outer diameter 900 that fills the inner diameter of the first opening 406 of the enclosure. A connection flange 902 extends from the outer diameter 900 and includes multiple fastener openings 904 into which a fastener may be disposed to connect the housing 408 to the enclosure 402. The housing 408 also includes an inner diameter 906 that defines a chamber 908 into which an insert (1100, FIG. 11) containing the RFID tag can be inserted.

The housing 408 includes a RFID reader cavity 1000, which can hold the RFID reader 1001, that is separated the chamber 908 by a chamber wall 1002. The chamber wall 1002 may be made of the material that permits passage of the wireless signals between the RFID reader and the RFID tag. With the RFID reader disposed within the RFID reader cavity 1000, the RFID reader is housed inside the enclosure 402 within a purged environment. In some cases, the RFID reader is a 24 VDC device that may not be permitted in an area on a drill rig that is classified as hazardous. However, within the purged environment of the enclosure, this type of RFID reader may be operated under certain standards.

Figure 13:
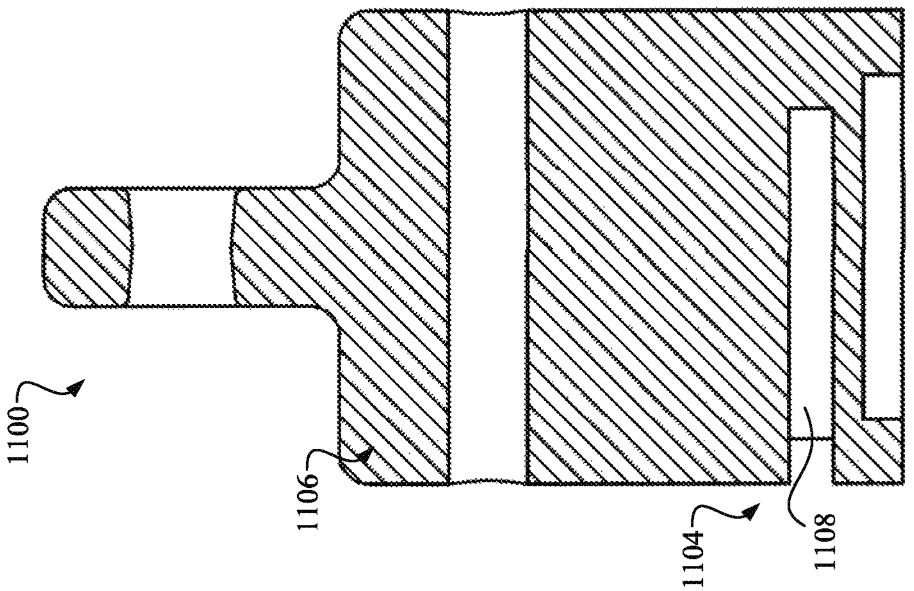
FIG. 13 depicts a cross sectional view of an example of an RFID insert in accordance with the present disclosure.
Figure 12:
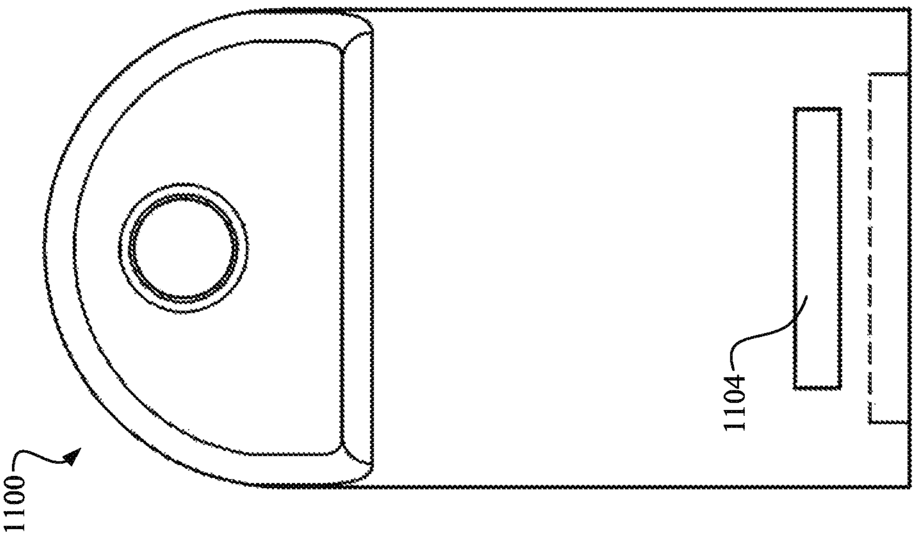
FIG. 12 depicts a side view of an example of an RFID insert in accordance with the present disclosure.
Figure 11:
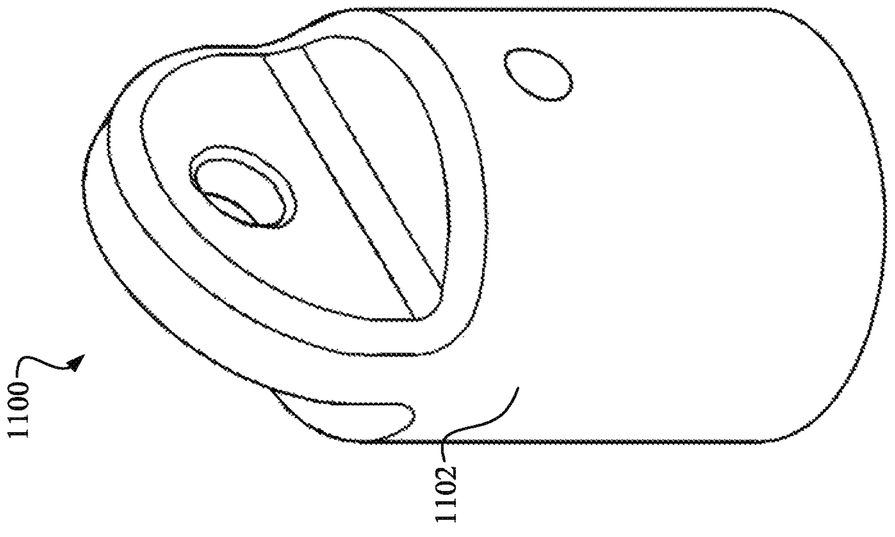
FIG. 11 depicts a perspective view of an example of an RFID insert in accordance with the present disclosure.

FIGS. 11-13 depict an example of an insert 1100 that can house the RFID tag. FIG. 11 depicts a perspective view of an outside of the insert 1100, FIG. 12 depicts an example of a side view of the insert 1100, and FIG. 13 depicts a cross sectional view of the insert 1100. The insert 1100 includes profile 1102 that allows the insert 1100 to be fitted within the chamber 908 of the housing 408.

A slot 1104 is defined in a body 1106 of the insert 1100, and the RFID tag 1108 may be secured within the slot 1104. The RFID tag 1108 may be housed inside the insert and also be connected to a power plug of a motor of the centrifuge. When the insert is secured within the chamber 908 of the housing 408, the RFID reader and the RFID tag can be secured within the same housing 408. However, the location of the RFID reader may be within the purged environment of the enclosure 402, and the location of the RFID tag may be located outside of the enclosure within the hazardous environment, but still within the housing 408. The RFID tag and the RFID reader, while in different environments, may be in wireless communication with each other through the material of the housing which permits the passage of wireless signals.

In some cases, the RFID tags are passive and the RFID reader sends a signal to the RFID tag to obtain information from the RFID tag. Using a passive RFID tag may minimize the amount of energy used to operate devices within the hazardous environment.

The insert 1100 may be securely fastened to a cord that electrically connects the insert 1100 to the centrifuge. In other examples, the RFID tag and the insert 1100 are not connected to the centrifuge. In this example, a separate cable may connect the controller to the centrifuge for operating the centrifuge.

Figure 14:
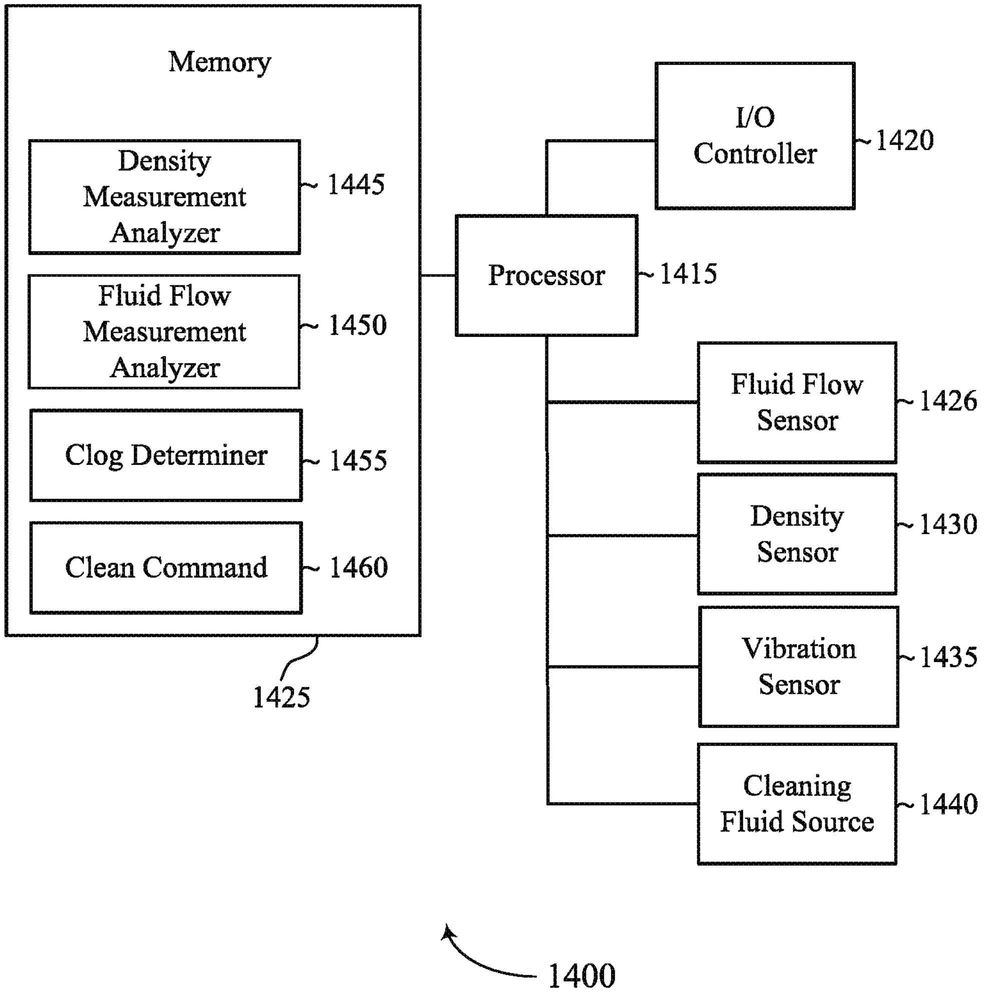
FIG. 14 depicts an example of a system for cleaning a diverter fluid circuit in accordance with the present disclosure.

FIG. 14 depicts a diagram of a system 1400 for measuring the density of a discharge fluid of a centrifuge. The system 1400 includes a processor 1415, an I/O controller 1420, memory 1425, a fluid flow sensor 1426, a density sensor 1430, a vibration sensor 1435, and a cleaning fluid source 1440. These components may communicate wirelessly, through hard wired connections, or combinations thereof. The memory 1425 of the system may include a density measurement analyzer 1445, a fluid flow measurement analyzer 1450, a clog determiner 1455, and clean command 1460.

The processor 1415 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1415 may be configured to operate a memory array using a memory controller. In other cases, a memory controller may be integrated into the processor 1415. The processor 1415 may be configured to execute computer-readable instructions stored in a memory to perform various functions (e.g., functions or tasks supporting the evaluation of prescribed optical devices).

The I/O controller 1420 may represent or interact with a modem, a keyboard, a mouse, a touchscreen, or a similar device. In some cases, the I/O controller 1420 may be implemented as part of the processor. In some cases, a user may interact with the system via the I/O controller 1420 or via hardware components controlled by the I/O controller 1420. The I/O controller 1420 may be in communication with any appropriate input and any appropriate output.

The memory 1425 may include random access memory (RAM) and read only memory (ROM). The memory 1425 may store computer-readable, computer-executable software including instructions that, when executed, cause the processor to perform various functions described herein. In some cases, the memory 1425 may contain, among other things, a basic input/output system (BIOS) which may control basic hardware and/or software operation such as the interaction with peripheral components or devices.

The density measurement analyzer 1445 represents programmed instructions that cause the processor 1415 to analyze the measurements of the density sensor 1430. In some examples, the density measurement analyzer can cause the density sensor to obtain a measurement of the discharge fluid in the diverter fluid circuit 108.

The fluid flow measurement analyzer 1450 represents programmed instructions that cause the processor 1415 to analyze the measurements of the fluid flow sensor 1426. In some cases, the fluid flow measurement analyzer 1450 merely determines whether a discharge fluid is flowing through the diverter fluid circuit 108 or not. In some cases, if the no discharge fluid is flowing through the diverter fluid circuit 108, then a stop command may be sent to the density sensor 1430 when the density sensor's accuracy depends on a fluid flow. In such an example, when the fluid flow measurement analyzer 1450 determines that a fluid is flowing through the diverter fluid circuit 108, then no stop command may be sent to the density sensor 1430. Additionally, in some cases, where the determination is that no discharge fluid is flowing through the diverter fluid circuit 108, the fluid flow analyzer may cause that a trouble shooting command be sent to determine the cause of no discharge fluid flowing through the diverter fluid circuit 108. In some cases, a signal may be sent to the cleaning fluid source 1440 to flush the diverter fluid circuit 108 when no flow is determined. After the diverter fluid circuit 108 is flushed, the fluid flow sensor 1426 may be triggered to take another measurement to determine whether the discharge fluid is flowing.

In some cases, if discharge fluid is determined to be flowing through the diverter fluid circuit 108, a signal may be sent to the density sensor 1430 to take a measurement. In such an example, the fluid flow sensor 1426 may be triggered to obtain a flow measurement before the density sensor 1430 obtains a density measurement.

In other examples, the fluid flow measurement analyzer 1450 determines more than merely determining the existence or lack of a discharge fluid flow. In such examples, the speed of the discharge fluid flow, the volume of the discharge flow, the pressure of the discharge fluid flow, other characteristics of the discharge fluid flow, or combinations thereof may be measured with the fluid flow sensor 1426.

The clog determiner 1455 represents programmed instructions that cause the processor 515 to determine whether the diverter fluid circuit 108 is clogged. In some examples, the clog determiner 1455 analyzes an output from the vibration sensor to determine an existence of a clog in the diverter fluid circuit 108. In some cases, the vibration sensor 1435 is connected to the diverter fluid circuit 108 or another location on the centrifuge to detect vibrations. Some vibration signatures may be associated with a clog in the diverter fluid circuit 108. In those events where the vibration sensor records a vibration signature, the clog determiner may determine that the vibration signature is associated with a clog. In response to determining a clog, the clog determiner 1455 may cause a command to be sent to the cleaning fluid source 1440 to clean the diverter fluid circuit 108.

The clean command 1460 represents programmed instructions that cause the processor 1415 to instruct the cleaning fluid source 1440 to clean the diverter fluid circuit 108. In some cases, the clean command is generated from an input from the fluid flow sensor 1426, an input from the vibration sensor 1435, a user generated instruction, another source, or combinations thereof.

Figure 15:
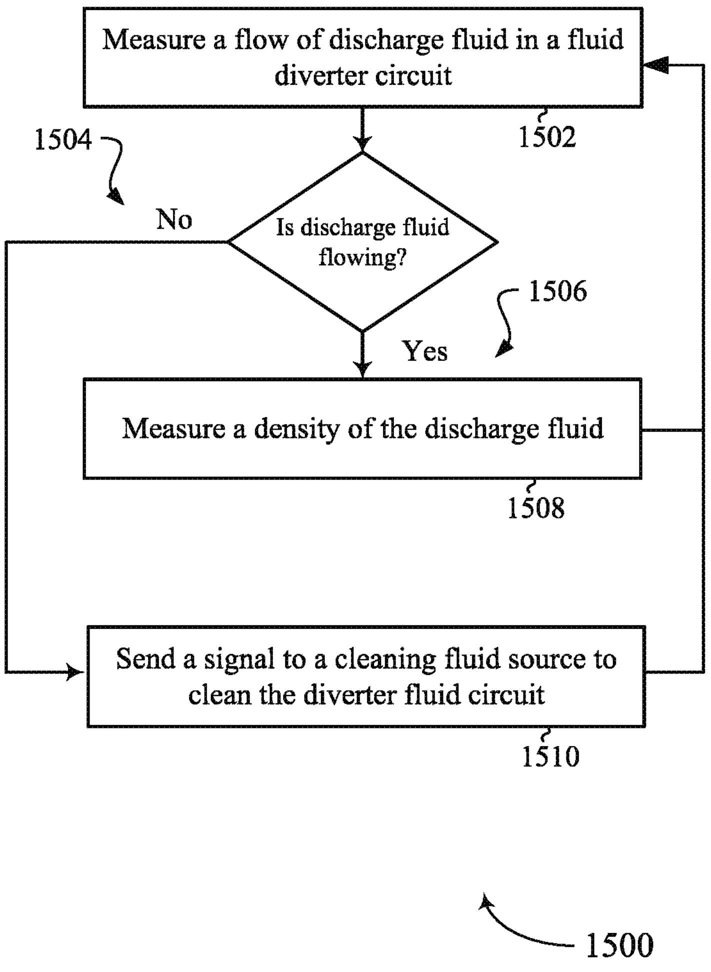
FIG. 15 depicts an example of a method for cleaning a diverter fluid circuit in accordance with the present disclosure.

FIG. 15 depicts an example of a method 1500 for measuring the density of a discharge fluid of a centrifuge in accordance with the present disclosure. In this example, the method 1500 includes measuring 1502 a flow of discharge fluid in a diverter fluid circuit 108. If no discharge fluid is flowing 1504, then the method 1500 includes sending 1510 a signal to a cleaning fluid source to clean the diverter fluid circuit 108 and then repeat measuring 1502 the flow of the discharge fluid. If there is a flow 1506 of discharge fluid, then the method 1500 includes measuring 1508 a density of the discharge fluid in the diverter fluid flow. At least some of the portions of this method may be carried out in accordance with the principles described in the present disclosure.

In one embodiment, an apparatus may include a hazardous environment barrier, an enclosure defined by the hazardous environment barrier, a controller of a machine disposed within the enclosure, a first opening defined in the hazardous environment barrier, a housing insertable into the first opening, an RFID reader disposed within the housing and within the enclosure when the housing is inserted into the first opening, and an RFID tag disposed within the housing and outside of the enclosure when the housing is inserted into the first opening.

In one embodiment, an apparatus may include a centrifuge bowl rotatable about its longitudinal axis, a discharge unit positioned to receive discharge fluid from the centrifuge bowl, a diverter fluid circuit 108 in communication with the discharge unit, a measurement region of the diverter fluid circuit 108 with a narrower diameter than a cross section of the discharge unit, and the diverter fluid circuit 108 oriented to direct a portion of the discharge fluid from the discharge unit to the measurement region.

While the above examples describe a controller and an RFID tag that are associated with centrifuge to operate the centrifuge, in other examples different types of machines are controlled by the controller and associated with the RFID tag. A non-exhaustive list of machines that may be associated with the RFID tag may include pumps, shakers, testing equipment, centrifuges, hydraulic fracturing equipment, cleaning equipment, drilling controllers, other types of equipment, or combinations thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus, comprising:
- a centrifuge bowl rotatable about its longitudinal axis;
- a discharge unit positioned to receive discharge fluid from the centrifuge bowl, the discharge unit comprising a first outlet and a second outlet;
- a diverter fluid circuit comprising a measurement region comprising a narrower diameter than a cross section of the discharge unit, wherein the diverter fluid circuit is coupled to the first outlet and a first portion of the discharge fluid flows through the first outlet to the measurement region, and wherein a second portion of the discharge fluid flows out of the discharge unit through the second outlet.

2. The apparatus of claim 1, wherein the measurement region comprises a density measurement sensor.

3. The apparatus of claim 1, wherein the discharge unit comprises a wide diameter to receive the discharge fluid in a rain fashion.

4. The apparatus of claim 1, wherein the diverter fluid circuit further comprises a diverter circuit outlet fluidly coupled to the discharge unit, wherein the first portion of the discharge fluid flows from the measurement region to the discharge unit through the diverter circuit outlet.

5. The apparatus of claim 1, wherein the measurement region further comprises a flow measurement sensor.

6. The apparatus of claim 5, wherein the diverter fluid circuit further comprises a cleaning fluid source, and wherein a release of a cleaning fluid from the cleaning fluid source cleans the first portion of the discharge fluid out of the diverter fluid circuit.

7. The apparatus of claim 6, wherein the cleaning fluid source comprises an air compressor.

8. The apparatus of claim 1, further comprising a controller, the controller comprising:
- an enclosure comprising a hazardous environment barrier and a first opening;
- a housing insertable into the first opening, the housing comprising an RFID reader disposed within the enclosure when the housing is inserted into the first opening; and
- an RFID tag disposed within the housing and outside of the enclosure when the housing is inserted into the first opening.

9. The apparatus of claim 8, wherein the RFID tag comprises at least one of a serial number, a type identifier, a model number, and an automation level identifier of the apparatus in communication the apparatus.

10. The apparatus of claim 8, wherein the enclosure further comprises a pressurized environment within the enclosure.

11. The apparatus of claim 8, the controller further comprises:
- a second opening in the enclosure, wherein a transparent window is disposed within the second opening, and a capacitive touchscreen film is disposed on an inner side of the transparent window;

a monitor disposed within the enclosure, wherein the monitor is viewable through the transparent window, and there is a gap between the monitor and the transparent window.

12. The apparatus of claim 11, wherein the gap is between 3.0 and 10.0 millimeters.

13. The apparatus of claim 11, wherein the gap is filled with a pressurized gas.

14. The apparatus of claim 8, wherein the hazardous environment barrier comprises stainless steel.

* * * * *